Aug. 9, 1927.

C. H. JULL

POWER SAW

Filed April 16, 1926

Witnesses:

Inventor:
CHARLES H. JULL,
by:
his Attorney.

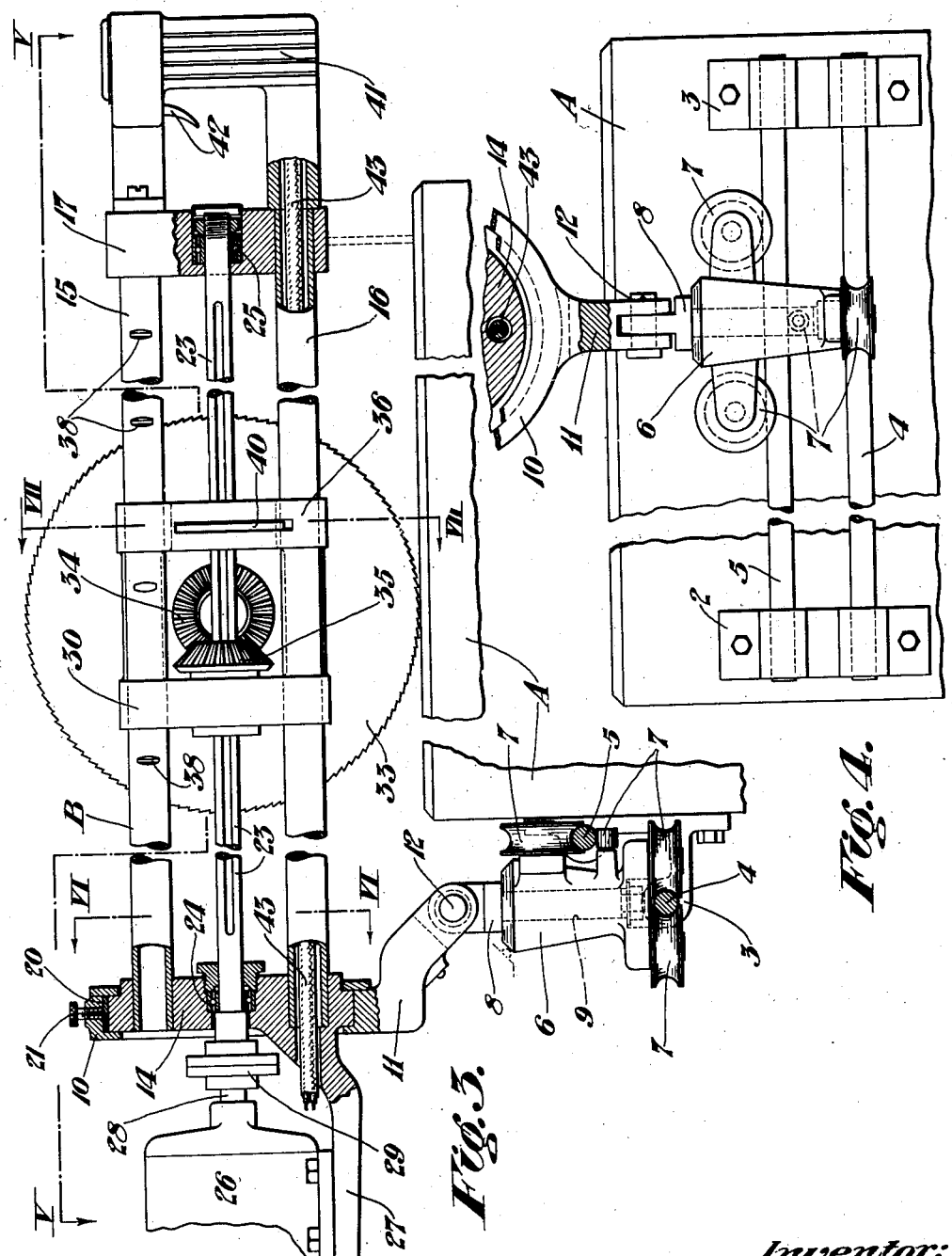

Aug. 9, 1927.
C. H. JULL
1,638,122
POWER SAW
Filed April 16, 1926
3 Sheets-Sheet 3
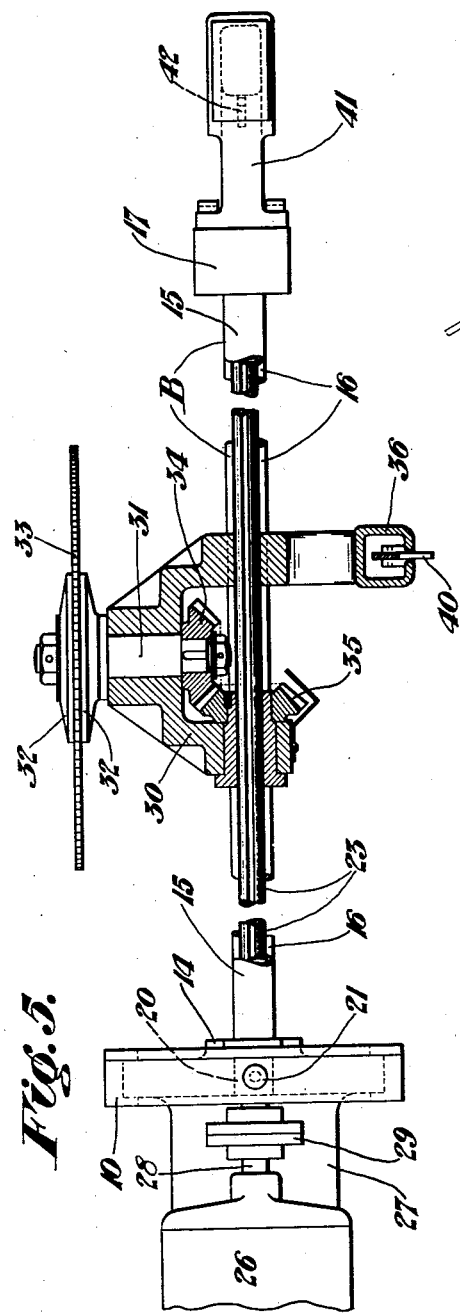
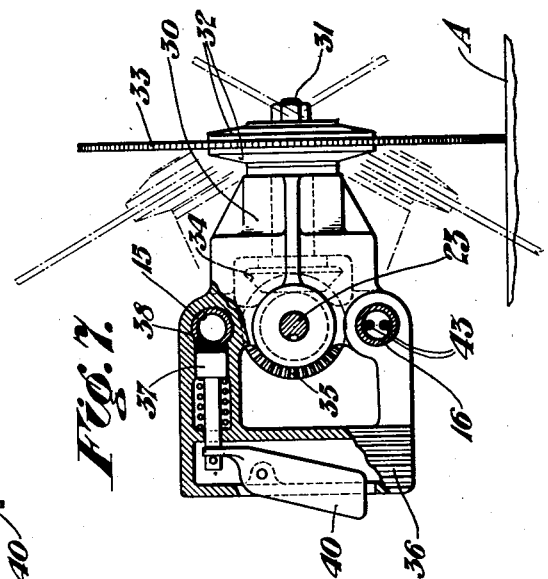
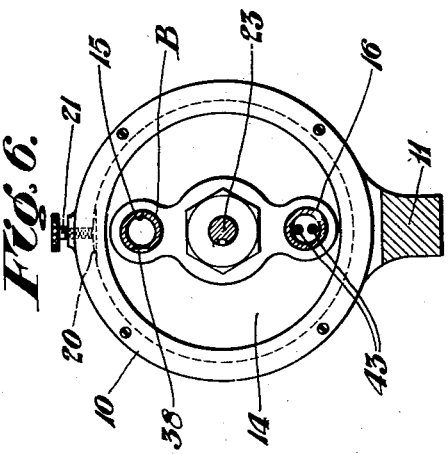
Witnesses:
Inventor:
CHARLES H. JULL,
by:
his Attorney.

Patented Aug. 9, 1927.

1,638,122

UNITED STATES PATENT OFFICE.

CHARLES H. JULL, OF BEN AVON, PENNSYLVANIA, ASSIGNOR TO PITTSBURGH-ERIE SAW COMPANY, OF PITTSBURGH, PENNSYLVANIA, A CORPORATION OF PENNSYLVANIA.

POWER SAW.

Application filed April 16, 1926. Serial No. 102,447.

This invention relates to saws and, while not limited thereto, relates more particularly to power meat saws for use by butchers, and has for its object a saw of this character adapted to be mounted on a butcher's block, table or other meat support and to have a universal movement relative thereto.

Another object is to provide a novel saw mounting for the saw which will provide for movement of the saw frame into various angular positions.

Another and important object is to provide a novel saw blade carrier movable longitudinally of the saw frame to adapt the saw for various meat cuts.

A still further object is to provide a saw of this class having the novel construction, combination and design of parts hereinafter described in detail and illustrated in the accompanying drawings.

In the drawings, Figure 1 is a side elevation showing a saw, constructed in accordance with this invention, mounted on a butcher's block.

Figure 3 is an enlarged side elevation thereof showing the details of the saw mounting.

Figure 4 is a rear elevation of the saw mounting.

Figure 5 is a sectional plan on the line V—V of Figure 3.

Figures 6 and 7 are transverse sectional elevations on the lines VI—VI and VII—VII, respectively, of Figure 3.

Figure 1:
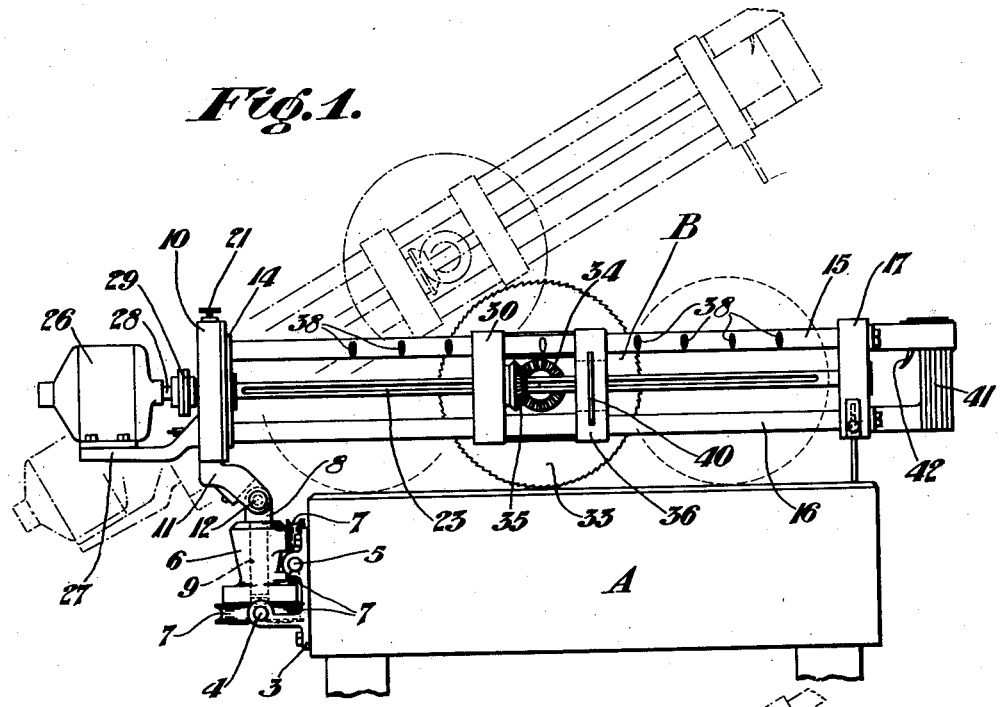
Figure 2:
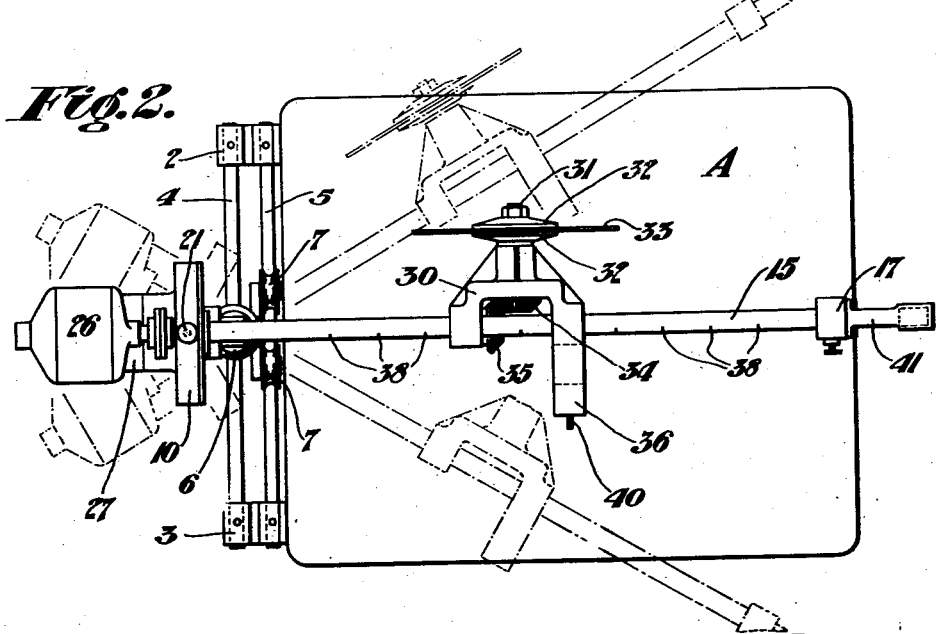
Figure 2 is a top plan view thereof.

Referring more particularly to the drawings, the letter A designates the butcher's block or table, which may be of any well-known and usual design generally used for supporting meat during the cutting operations.

A pair of brackets 2 and 3 are secured to the rear face of the block A and support a pair of rail or track rods 4 and 5 adapted to carry the saw. A wheeled carrier comprising a body portion 6 and supporting wheels 7 is mounted for longitudinal movement on the track members 4 and 5. A supporting member comprising a head portion 8 and a shank portion 9 is pivotally mounted on the carrier body 6 by having its shank portion 9 fitted within a vertical recess in the body 6 so as to provide for a horizontal swinging movement of said supporting member. A circular housing member 10 having a bracket portion 11 projecting forwardly from its bottom, has its bracket portion pivotally secured to the head 8 of said supporting member, as at 12, so as to be movable about a horizontal axis.

An elongated substantially rectangular saw frame B is supported by the housing 10, and comprises a rear end circular disk member 14, tubular top and bottom bar members 15 and 16, and a forward end member 17. The disk member 14 is adapted to be mounted in the circular housing member 10 so as to support the saw frame B and permit said frame to be turned about its horizontal axis to various angular positions.

A friction piece 20 is mounted in a recess in the housing 10 and is adapted to be forced down into engagement with the mounting disk 14 by a screw 21 to lock the saw frame in its adjusted angular positions.

A power shaft 23 extends longitudinally of the frame B and is journaled in anti-friction bearings 24 and 25 in the end members 14 and 17, respectively. A motor 26 is supported on a bracket 27 on the rear face of the mounting disk 14 of the frame, and has its armature shaft 28 coupled to the shaft 23 by a coupling 29.

A saw carrier 30 is slidably mounted on the bar members 15 and 16 of the frame B, and is provided with a horizontal or transverse saw shaft 31 journaled therein. The outer end of the shaft 31 is provided with a saw clamp 32 in which is mounted a circular or disk saw 33.

The rear end of the shaft 31 is provided with a bevel gear 34 which is in mesh with a second beveled gear 35 slidably mounted on the power shaft 23 and movable with the carrier 30.

The carrier 30 is provided with a handle 36 in which a spring-pressed latch member 37 is mounted and adapted to be engaged in notches 38 in the top bar member 15 of the frame B to lock the carrier 30 in position. A latch-operating handle 40 is mounted in the handle 36 for releasing the latch 37.

The saw frame B has a handle member 41 on its forward end, which has a control switch for the motor mounted therein and operated by the trigger 42. The control switch is not shown, since it may be of any standard construction, and forms no part of this invention. The wires 43 from the control switch extend from the handle 41 through the lower bar 16 of the frame to the motor 26.

In operation, the saw frame is movable bodily along the track rails or rods 4 and 5 by means of the wheeled carrier and, therefore, may be moved to different positions along the article being sawed. The pivotal connection between the shank 9 of the supporting member and the carrier permits the saw frame to be swung to various horizontal angular positions, and the pivotal connection at 12 between the head 8 of the supporting member and housing 10 permits the saw frame to be swung vertically to various angular positions, thus permitting a limited universal movement of the saw frame. In addition to the universal movement of the saw frame, the frame may be turned about its longitudinal axis to various angular positions, due to the mounting of the disk 17 in the housing 10.

Normally the saw frame is held in raised position. That is, the housing 10 and saw frame B are rocked about the pivotal connection 12 so as to elevate the saw frame above the top of the block or table A, as shown in dotted lines in Figure 1. The motor 28 is normally of sufficient weight to raise the saw frame into this normal position. However, it will be understood that if desired suitable counterweights may be employed if the weight of the motor is insufficient.

The saw carrier 30 may be adjusted along the frame B to any desired position, and locked in position by the latch 37, so as to facilitate the making of various cuts. The adjustable feature of this saw carrier is very important, since it permits the operator to correctly position the saw blade to the most advantageous position for the many different cutting operations, and allows for cutting at any point along the block or table A.

While I have shown and described only one specific embodiment of my invention, it will be understood that I do not wish to be limited thereto, since various modifications may be made without departing from the scope of my invention as defined in the appended claims.

I claim:

1. A power saw comprising in combination, a housing member mounted for lateral and vertical swinging movement, an elongated saw frame revolvably mounted in said housing, a saw carrier mounted on said frame and adapted to be moved longitudinally thereof, a saw mounted on said carrier, and means for locking said carrier against movement on said frame.

2. A power saw comprising in combination, a housing member mounted for lateral and vertical swinging movement, an elongated saw frame revolvably mounted in said housing, a saw carrier mounted on said frame and adapted to be moved longitudinally thereof, a horizontal shaft journaled in said carrier, a disk saw mounted on said shaft, a motor mounted on said frame, and means forming an operative connection between said motor and said shaft.

3. A power saw comprising in combination, a housing member mounted for lateral and vertical swinging movement, an elongated saw frame revolvably mounted in said housing, a saw carrier mounted on said frame and adapted to be moved longitudinally thereof, a power shaft extending longitudinally of and journaled in said frame, means connecting said motor and said power shaft, and means connecting said power shaft and said horizontal shaft.

4. A power saw comprising in combination, a housing member mounted for lateral and vertical swinging movement, a saw support revolvably mounted in said housing and adapted to be turned to various angular positions, said saw support comprising an elongated frame member having a mounting disk on its rear end and mounted in said housing, a saw carrier mounted on said frame and adapted to be moved longitudinally thereof, a saw mounted on said carrier, and means for locking said carrier against movement on said frame.

5. A power saw comprising in combination, a housing member mounted for lateral and vertical swinging movement, a saw support revolvably mounted in said housing and adapted to be turned to various angular positions, said saw support comprising an elongated frame member having a mounting disk on its rear end and mounted in said housing, a saw carrier mounted on said frame and adapted to be moved longitudinally thereof, a horizontal shaft journaled in said carrier, a disk saw mounted on said shaft, a motor mounted on said mounting disk, and means forming an operative connection between said motor and said shaft.

6. A power saw comprising in combination, a housing member mounted for lateral and vertical swinging movement, a saw support revolvably mounted in said housing and adapted to be turned to various angular positions, said saw support comprising an elongated frame member having a mounting disk on its rear end and mounted in said housing, a saw carrier mounted on said frame and adapted to be moved longitudinally thereof, a horizontal shaft journaled in said carrier, a disk saw mounted on said shaft, a motor mounted on said mounting disk, a power shaft extending longitudinally of and journaled in said frame, means connecting said motor and said power shaft, a beveled gear on said horizontal shaft, a second beveled gear slidably mounted on said longitudinal shaft and adapted to move with said carrier, said second named gear being meshed with said first named gear to form an operative connection between said power shaft and said horizontal shaft.

In testimony whereof, I have hereunto signed my name.

CHARLES H. JULL.